US012264398B2

(12) United States Patent
Lavernia et al.

(10) Patent No.: US 12,264,398 B2
(45) Date of Patent: Apr. 1, 2025

(54) SOLID OXIDE ELECTROLYZER SYSTEM INCLUDING AIR BYPASS

(71) Applicant: BLOOM ENERGY CORPORATION, San Jose, CA (US)

(72) Inventors: Alejandro Carlos Lavernia, San Jose, CA (US); Kidus Tsegay, San Jose, CA (US); Navaneethakrishnan Govindarasu, San Jose, CA (US); Mark Stanton, Santa Clara, CA (US); Andy Ta, San Jose, CA (US); David Edmonston, Soquel, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/654,771

(22) Filed: May 3, 2024

(65) Prior Publication Data

US 2024/0368774 A1    Nov. 7, 2024

Related U.S. Application Data

(60) Provisional application No. 63/463,997, filed on May 4, 2023.

(51) Int. Cl.
| | |
|---|---|
| *C25B 1/042* | (2021.01) |
| *C25B 9/67* | (2021.01) |
| *C25B 9/73* | (2021.01) |
| *C25B 15/021* | (2021.01) |
| *C25B 15/029* | (2021.01) |
| *C25B 15/08* | (2006.01) |

(52) U.S. Cl.
CPC ............ *C25B 1/042* (2021.01); *C25B 9/67* (2021.01); *C25B 9/73* (2021.01); *C25B 15/021* (2021.01); *C25B 15/029* (2021.01); *C25B 15/083* (2021.01)

(58) Field of Classification Search
CPC ................. C25B 1/04; C25B 1/042
See application file for complete search history.

(56) References Cited

U.S. PATENT DOCUMENTS

| | | | |
|---|---|---|---|
| 10,957,921 B2 | 3/2021 | Weingaertner et al. | |
| 2008/0289955 A1* | 11/2008 | Balestrino | C25B 1/04 204/274 |
| 2018/0287172 A1* | 10/2018 | Chatroux | C25B 9/73 |
| 2018/0287179 A1* | 10/2018 | Rueger | C25B 15/02 |
| 2020/0168922 A1 | 5/2020 | Weingaertner et al. | |
| 2020/0358112 A1* | 11/2020 | Chatroux | H01M 8/12 |

(Continued)

OTHER PUBLICATIONS

U.S. Appl. No. 18/529,414, filed Dec. 5, 2023, Bloom Energy Corp.

(Continued)

*Primary Examiner* — Harry D Wilkins, III
(74) *Attorney, Agent, or Firm* — THE MARBURY LAW GROUP PLLC

(57) ABSTRACT

An electrolyzer system includes a splitter configured to split a first air inlet stream into a bypass air stream and a second air inlet stream, a stack of electrolyzer cells configured receive steam and the second air inlet stream and output a product stream containing hydrogen and an oxygen exhaust stream, such that the bypass air stream is configured to bypass the stack, and a product cooler heat exchanger configured to cool the product stream using the first air inlet stream.

10 Claims, 4 Drawing Sheets

(56) References Cited

U.S. PATENT DOCUMENTS

2022/0372636 A1   11/2022   Weingaertner et al.
2023/0013942 A1    1/2023   Weingaertner et al.
2023/0155214 A1    5/2023   Weingaertner et al.

OTHER PUBLICATIONS

U.S. Appl. No. 18/597,298, filed Mar. 6, 2024, Bloom Energy Corp.
U.S. Appl. No. 18/601,757, filed Mar. 11, 2024, Bloom Energy Corp.

\* cited by examiner

Experimental Data:

Simulation:

SOLID OXIDE ELECTROLYZER SYSTEM INCLUDING AIR BYPASS

FIELD

The embodiments of the present invention are generally directed to hydrogen generation systems that include solid oxide electrolyzer cells (SOECs), and in particular, to hydrogen generation systems that include an air bypass to control air flow to the SOECs.

BACKGROUND

In a solid oxide electrolyzer cell (SOEC), a positive potential is applied to the air side of the cell and oxygen ions are transported from the fuel (e.g., steam) side to the air side. Since the cathode and anode are reversed between a solid oxide fuel cell (SOFC) and a SOEC (i.e. SOFC cathode is SOEC anode, and SOFC anode is SOEC cathode), going forward, the SOFC cathode (SOEC anode) will be referred to as the air electrode, and the SOFC anode (SOEC cathode) will be referred to as the fuel electrode. During SOEC operation, water (e.g., steam) is provided to the fuel electrode and is reduced ($H_2O + 2e^- \rightarrow O^{2-} + H_2$) to form $H_2$ gas and $O^{2-}$ ions, the $O^{2-}$ ions are transported through the solid electrolyte, and then oxidized (e.g., by an air inlet stream) on the air side ($O^{2-}$ to $O_2$) to produce molecular oxygen (e.g., oxygen enriched air).

SUMMARY

In various embodiments, an electrolyzer system includes a splitter configured to split a first air inlet stream into a bypass air stream and a second air inlet stream, a stack of electrolyzer cells configured receive steam and the second air inlet stream and output a product stream containing hydrogen and an oxygen exhaust stream, such that the bypass air stream is configured to bypass the stack, and a product cooler heat exchanger configured to cool the product stream using the first air inlet stream.

In various embodiments, a method of operating an electrolyzer system includes splitting a first air inlet stream into a bypass air stream and a second air inlet stream; providing steam and the second air inlet stream to a stack of electrolyzer cells, wherein the bypass air stream bypasses the stack; electrolyzing the steam in the stack and outputting a product stream containing hydrogen and an oxygen exhaust stream from the stack; and cooling the product stream using the first air inlet stream.

DETAILED DESCRIPTION

Figure 1A:
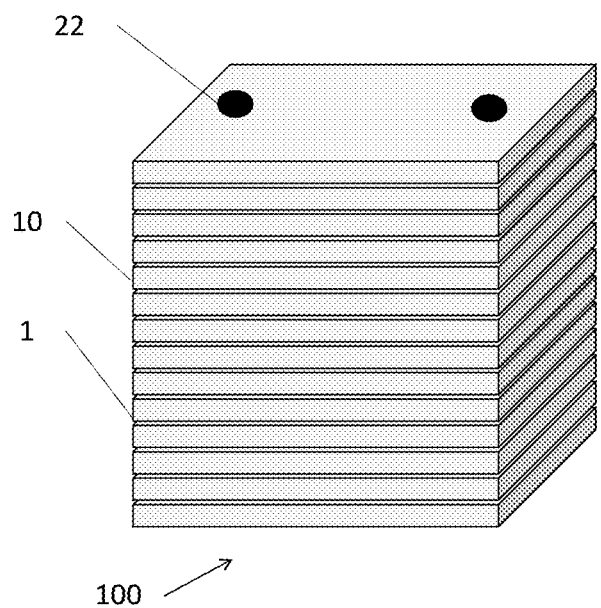
FIG. 1A is a perspective view of an electrolyzer cell stack.
Figure 1B:
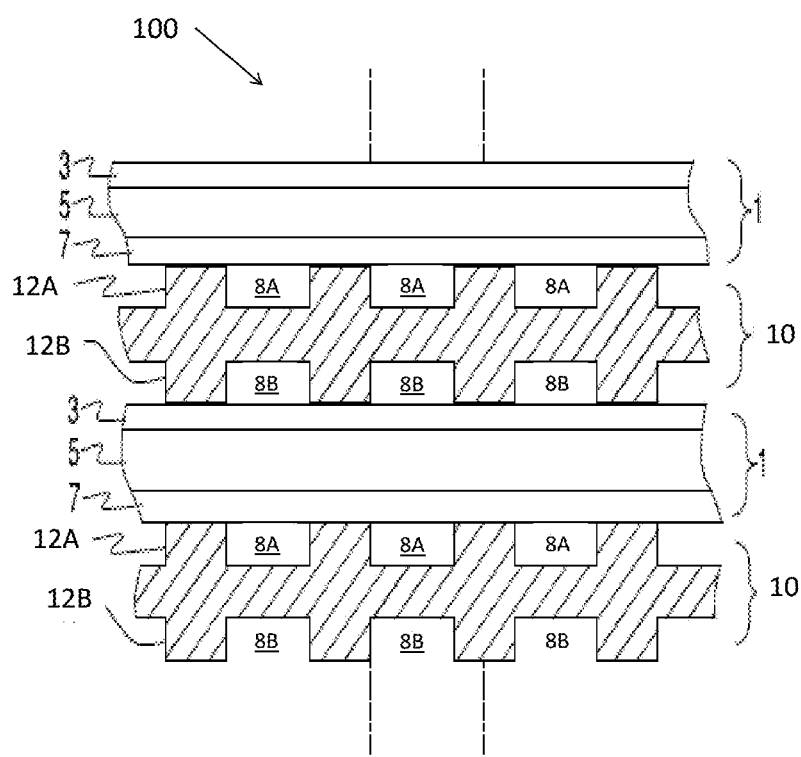
FIG. 1B is a side cross-sectional view of a portion of the stack of FIG. 1A.

FIG. 1A is a perspective view of an electrolyzer cell stack 100, such as a solid oxide electrolyzer cell (SOEC) stack, and FIG. 1B is a side cross-sectional view of a portion of the stack 100 of FIG. 1A. Referring to FIGS. 1A and 1B, the stack 100 includes multiple electrolyzer cells 1, such as SOECs that are separated by interconnects 10, which may also be referred to as gas flow separator plates or bipolar plates. Each electrolyzer cell 1 includes an air electrode 3, an electrolyte 5, such as a solid oxide electrolyte for a SOEC, and a fuel electrode 7. The stack 100 also includes internal fuel riser channels 22.

Each interconnect 10 electrically connects adjacent electrolyzer cells 1 in the stack 100. In particular, an interconnect 10 may electrically connect the fuel electrode 7 of one electrolyzer cell 1 to the air electrode 3 of an adjacent electrolyzer cell 1. FIG. 1B shows that the lower electrolyzer cell 1 is located between two interconnects 10.

Each interconnect 10 includes fuel ribs 12A that at least partially define fuel channels 8A, and air ribs 12B that at least partially define air channels 8B. The interconnect 10 may operate as a gas-fuel separator that separates the fuel/steam side of one electrolyzer cell 1 from the air side of an adjacent electrolyzer cell 1. The interconnect separates the steam provided to the fuel electrode 7 of one electrolyzer cell 1 in the stack 100 from air provided to the air electrode 3 of an adjacent electrolyzer cell 1 in the stack 100. The optional air flow serves as a sweep gas to entrain the oxygen transported across the electrolyte 5 by electrolysis. At either end of the stack 100, there may be an air end plate or fuel end plate (not shown) for providing air or steam, respectively, to the end electrode.

Figure 2:
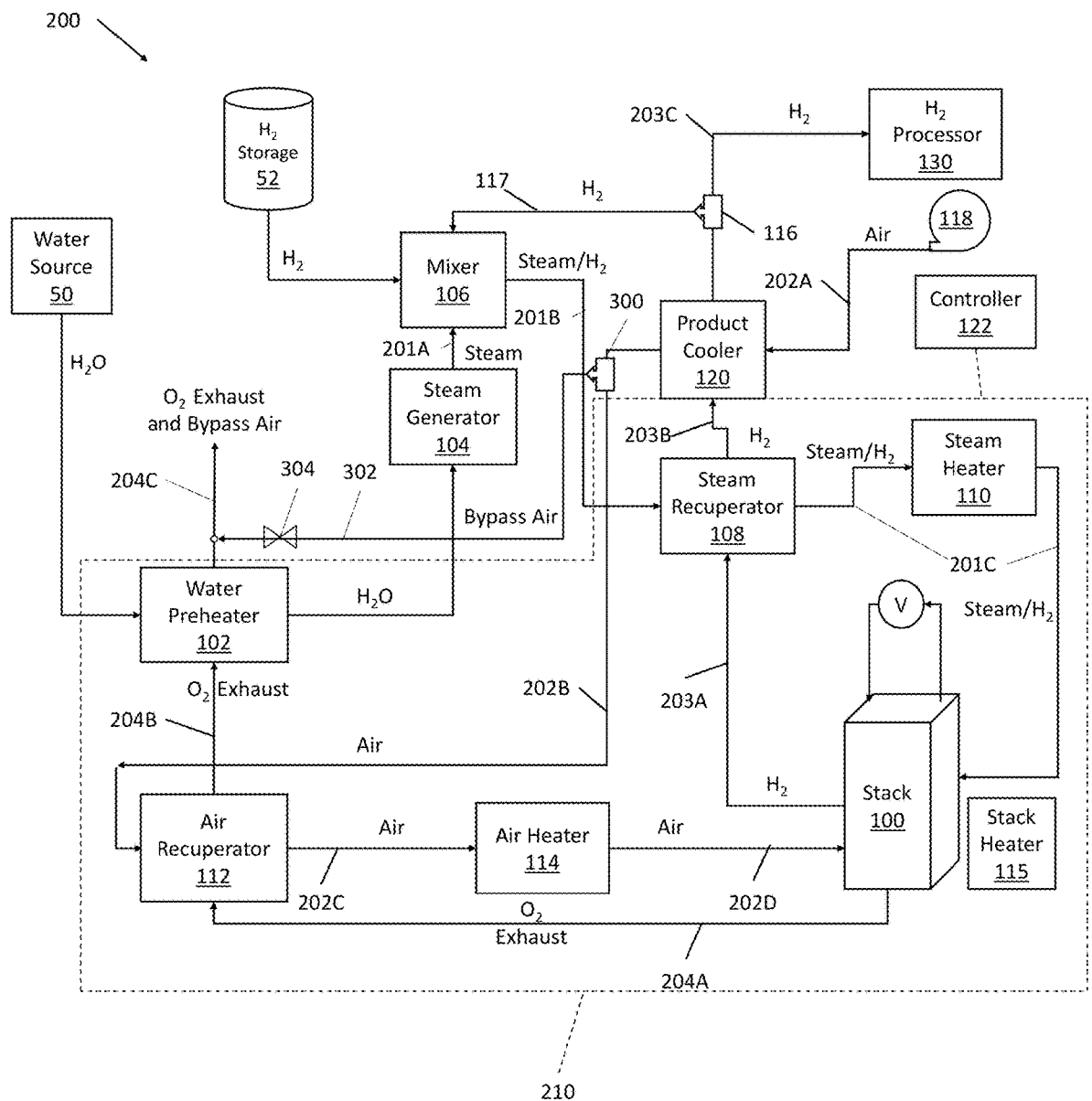
FIG. 2 is a schematic view showing process flows through an electrolyzer system according to various embodiments of the present disclosure.

FIG. 2 is a schematic view showing process flows in a SOEC system 200, according to various embodiments of the present disclosure. Referring to FIGS. 1A, 1B, and 2, the SOEC system 200 may include an electrolyzer cell (e.g., SOEC) stack 100 including multiple electrolyzer cells (e.g., SOECs) 1, as described with respect to FIGS. 1A and 1B. The system 200 may include plural stacks 100. The stacks 100 may be arranged in columns, such that each column contains one or more stacks 100. The SOEC system 200 may also include a steam generator 104, a steam recuperator heat exchanger 108, a steam heater 110, an air recuperator heat exchanger 112, an air heater 114, a stack heater 115 and a product cooler heat exchanger 120. The SOEC system 200 may also include an optional water preheater 102, an optional mixer 106 and optional additional heaters, such as one or more stack 100 heaters.

The SOEC system 200 may include a hotbox 210 to house various components, such as the stack 100, steam recuperator 108, steam heater 110, air recuperator 112, and/or air heater 114. In some embodiments, the hotbox 210 may include multiple stacks 100. The water preheater 102 and the steam generator 104 may be located external to the hotbox 210. Alternatively, the water preheater 102 and/or the steam generator 104 may be located inside the hotbox 210. In another alternative, the water preheater 102 may be located inside the hotbox 210 and the steam generator 104 may be located outside the hotbox 210, as shown in FIG. 2. Alternatively, the steam generator 104 may be omitted if water from a water source 50 is provided as steam. In this case, the water preheater 102 may also be omitted or may be retained to function as a heat exchanger which increases a temperature of the steam provided from the water source 50. As will be readily understood, other configurations are feasible without departing from the invention.

During operation, the stack 100 may be provided with steam (e.g., steam inlet stream) and electric power (e.g., current or voltage) from an external power source. In particular, the steam may be provided to the fuel electrodes 7 of the electrolyzer cells 1 of the stack 100, and the power source may apply a voltage between the fuel electrodes 7 and the air electrodes 3, in order to electrochemically split water (e.g., steam) molecules and generate hydrogen and oxygen. Air may also be provided to the air electrodes 3, in order to sweep the oxygen from the air electrodes 3. As such, the stack 100 may output a hydrogen stream and an oxygen-rich exhaust stream, such as an oxygen-rich air stream ("oxygen exhaust stream").

In order to generate the steam, water may be provided to the SOEC system 200 from a water source 50. The water source 50 may include a municipal water supply (e.g., water pipe), a water storage tank and/or an external steam source (e.g., a factory or a power plant). The water may be deionized (DI) water that is deionized as much as is practical (e.g., <0.1 $\mu$S/cm, or at least <1 $\mu$S/cm), in order to prevent and/or minimize scaling during vaporization. In some embodiments, the water source 50 may include deionization beds. In various embodiments, the SOEC system 200 may include a water flow control device (not shown) such as a mass flow controller, a positive displacement pump, a control valve/water flow meter, or the like, in order to provide a desired water (e.g., liquid water or steam) flow rate to the SOEC system 200.

If the SOEC system 200 includes the water preheater 102, the water may be provided from the water source 50 to the water preheater 102. The water preheater 102 may be a heat exchanger configured to heat the water using heat recovered from the oxygen exhaust stream from the stack 100. Preheating the water may reduce the total power consumption of the SOEC system 200 per unit of hydrogen generated. In particular, the water preheater 102 may recover heat from the oxygen exhaust stream that may not be recoverable by the air recuperator 112. The water preheater may heat the water to a temperature above 50° C., such as a temperature of about 70° C. to 80° C. The oxygen exhaust stream may be output from the water preheater 102 at a temperature above 80° C., such as above 100° C., such as a temperature of about 110° C. to 120° C. Alternatively, the water preheater 102 may be omitted or may be used to increase the temperature of the steam inlet stream if the water source 50 supplies steam at a temperature above 100° C. rather than liquid water.

The water output from the water preheater 102 (or from the water source 50 if the water preheater 102 is omitted) may be provided to the steam generator 104. A portion of the water may vaporize in the water preheater 102. The steam generator 104 may be configured to heat the water to convert the water into steam. The steam generator 104 may include a heating element to vaporize the water and generate steam. For example, the steam generator 104 may include an AC or DC resistance heating element, or an induction heating element. Alternatively, the steam generator 104 may be omitted if the water source 50 supplies steam rather than liquid water.

The steam output from the steam generator 104 may be provided to the steam recuperator 108 via one or more steam conduit(s) 201A, 201B. If the SOEC system 200 includes the optional mixer 106, the steam may be provided to the mixer 106 via the steam conduit 201A prior to being provided from the mixer 106 to the steam recuperator 108 via the steam conduit 201B. In particular, the steam may include small amounts of dissolved air and/or oxygen. As such, the mixer 106 may be configured to mix the steam with hydrogen gas, in order to maintain a reducing environment in the stack 100, and in particular, at the fuel electrodes 7.

The mixer 106 may be configured to mix the steam with hydrogen received from the hydrogen source 52 and/or with a portion of the hydrogen stream output from the stack 100. The hydrogen addition rate may be set to provide an amount of hydrogen that exceeds an amount of hydrogen needed to react with an amount of oxygen dissolved in the steam. The hydrogen addition rate may either be fixed or set to a constant water to hydrogen ratio. However, if the steam is formed using water that is fully deaerated, the mixer 106 and/or hydrogen addition to the steam may optionally be omitted.

In some embodiments, the hydrogen may be provided from the external hydrogen source 52 to the mixer 106 during system startup and shutdown modes, and optionally during the steady-state operation mode. For example, during the startup and shutdown modes (or other modes where the system 200 is not generating hydrogen, such as a fault mode), the hydrogen may be provided from the hydrogen source 52. During the steady-state operating mode, the hydrogen may be provided from the hydrogen source 52 and/or by diverting a portion of the hydrogen stream (i.e., hydrogen exhaust stream) generated by the stack 100 to the mixer 106. During the steady-state operating mode, the hydrogen flow from the hydrogen source 52 may be stopped (e.g., by shutting off the outlet valve from the hydrogen source). Furthermore, the SOEC system 200 may include a hydrogen separator 116, such as a splitter, pump, blower and/or valve, configured to selectively divert a portion of the generated hydrogen stream to the mixer 106 during the steady-state operation mode. In particular, the separator 116 may be fluidly connected to the mixer 106 by a recycling conduit 117. As used herein, fluidly connected means either direct fluid connection between two components or an indirect fluid connection between two components which includes at least one additional conduit or component.

The steam recuperator 108 may be a heat exchanger configured to recover heat from the hydrogen stream output from the stack 100. The steam may be heated to a range between 600° C. to 830° C. in the steam recuperator 108. In some instances, the steam is heated to within 10° C. to 150° C. of the stack 100 operating temperature. For example, the stack 100 operating temperature may be 700° C. or 750° C., or there between, and the steam may be heated to at least 600° C., such as 650° C. to 740° C. in the steam recuperator 108.

The steam output from the steam recuperator 108 may be provided to the steam heater 110 which is located downstream from the steam recuperator 108, as shown in FIG. 2. Alternatively, the steam heater 110 may be provided adjacent to (e.g., next to or surrounding) the steam recuperator 108. The steam heater 110 may include a heating element, such as a resistive or inductive heating element. The steam heater 110 may be configured to heat the steam to a temperature at or above the operating temperature of the stack 100. For example, depending on the health of the stack 100, the water utilization rate of the stack 100, and the air flow rate to the stack 100, the steam heater 110 may heat the steam to a temperature ranging from 650° C. to about 1000° C., such as 700° C. to 950° C. In some embodiments, the steam heater 110 may include multiple steam heater zones with independent power levels (divided vertically or circumferentially or both), in order to enhance thermal uniformity. The steam is provided from the steam recuperator 108 and steam heater 110 to the stack via steam conduit 201C.

The stack 100 electrolyzes the steam and outputs a hydrogen product stream into hydrogen conduit 203A. The stack 100 may be heated by an optional stack heater 115 during the electrolysis. The stack heater 115 may include a resistive or inductive heating element configured to heat the stack 100. The hydrogen product stream in the hydrogen conduit 203A includes a mixture of the hydrogen product and any remaining water (e.g., steam) that was not electrolyzed in the stack 100. The hydrogen product stream is cooled in the steam recuperator 108 by exchanging heat with the steam inlet stream. The cooled hydrogen product stream is provided from the steam recuperator 108 to the product cooler 120 via a hydrogen conduit 203B.

An air blower 118 provides an air inlet stream to the product cooler 120 via an air conduit 202A. The product cooler 120 may be disposed outside of the hotbox 210 and is configured to preheat the air inlet stream using heat extracted from the hydrogen product stream output from the steam recuperator 108. The product cooler 120 may be used to cool the hydrogen product stream output from the stack 100 and the steam recuperator 108 to a temperature of about 200° C. or less, such as about 180° C. or less, in order to facilitate further processing of the hydrogen product in the hydrogen processor 130.

The hydrogen product stream is output from the steam recuperator 108 to the hydrogen processor 130 via a hydrogen product conduit 203C. The optional hydrogen separator 116 may be fluidly connected to the hydrogen product conduit 203C to provide a portion of the hydrogen product stream to the mixer 106 via the recycling conduit 117. The recycled stream in the recycling conduit 117 may comprise a steam rich stream comprising more than 50 volume percent steam.

The remaining hydrogen product stream in the hydrogen product conduit 203C is provided to the hydrogen processor 130 at a temperature of 120° C. to 150° C. where it may be compressed and/or purified. The hydrogen processor 130 may include at least one electrochemical hydrogen pump, liquid ring compressor, diaphragm compressor, other compression device, or combination thereof. For example, the hydrogen processor may include a series of electrochemical hydrogen pumps, which may be disposed in series and/or in parallel with respect to a flow direction of the hydrogen product stream, in order to compress the hydrogen product stream. For example, the hydrogen processor 130 may include a high temperature hydrogen pump that operates at a temperature of from about 120° C. to about 150° C., in order to remove from about 70% to about 90% of the hydrogen from the hydrogen product stream. A remaining unpumped effluent from the hydrogen pump comprises a steam rich stream which may be fed to a blower for recycling into the mixer 106 or the stream recuperator 108, eliminating and/or reducing the need for water vaporization in the steam generator 104.

The preheated air inlet stream is provided from the product cooler 120 to the air recuperator 112 via an air conduit 202B. The oxygen exhaust steam (e.g., oxygen enriched air) output from the stack 100 may be provided to the air recuperator 112 via an exhaust conduit 204A. The air recuperator 112 may be configured to heat the pre-heated air inlet stream received from the product cooler 120 using heat extracted from the oxygen exhaust stream. The oxygen exhaust stream may be provided to the water preheater 102 via an exhaust conduit 204B, and then exhausted from the hotbox 210 via an exhaust conduit 204C.

The air inlet stream output from the air recuperator 112 may be provided to the air heater 114 via an air conduit 202C. Alternatively, the air heater 114 may be located adjacent to (e.g., next to or surrounding) the air recuperator 112. The air heater 114 may include a resistive or inductive heating element configured to heat the air inlet stream. For example, depending on the health of the stack 100, the water utilization rate of the stack 100, and the air flow rate to the stack 100, the air heater 114 may heat the air to a temperature ranging from about 650° C. to about 1000° C., such as 700° C. to 950° C. The air inlet stream from the air heater 114 is provided to the air electrodes 3 of the stack 100 via an air conduit 202D.

According to various embodiments, the SOEC system 200 may include a controller 122, such as a central processing unit, that is configured to control the operation of the SOEC system 200. For example, the controller 122 may be wired or wirelessly connected to various elements of the SOEC system 200, such as heater(s), blower(s), valve(es), etc., to control the same.

Air Recuperator Bypass

Electrolyzer systems, such as SOEC systems, may operate using relatively low air flow rates, since air is primarily used as a sweep gas to remove oxygen generated during electrolysis. Therefore, the efficiency of the SOEC system 200 may be increased by reducing the air flow rate provided to the stack 100 through the air heater 114, because the air heater 114 and the stack heater 115 use less heating power to heat a smaller amount of air provided to the stack 100.

However, the product cooler 120 uses a relatively large air inlet stream flow rate to cool the hydrogen product stream to temperatures suitable for further processing in the hydrogen processor 130. Therefore, reducing the air flow rate from the air blower 118 (e.g., reducing the air blower speed) also reduces the air inlet stream flow rate through the product cooler 120. As a result, reducing the speed of the air blower 118 would undesirably increase the temperature of the hydrogen product stream output from the product cooler 120 to the hydrogen processor 130, which may damage the hydrogen processor 130.

Embodiments of the present disclosure provide an electrolyzer system and operating method in which a portion of the air inlet stream output from the product cooler 120 bypasses the air recuperator 112, the air heater 114 and the stack 100. Thus, a sufficiently large volume of air is provided to the product cooler 120 to sufficiently cool the hydrogen product steam in the product cooler 120, while a smaller amount of air is provided to the stack 100 through the air heater 114 from the product cooler 120. This permits the air heater 114 and the stack heater 115 to operate at a lower power to heat the smaller amount of air being provided into the stack 100 and to decrease the amount of extra heat provided to the stack 100, respectively. This increases the efficiency of the electrolyzer system 200. In one embodiment, the bypassed portion of the air inlet stream may entirely bypass the hotbox 210 and is exhausted from the system 200 without being used within the hotbox 210. The embodiments improve system efficiency while retaining the ability to sufficiently cool the hydrogen product stream provided to the hydrogen processor 130.

Figure 3:
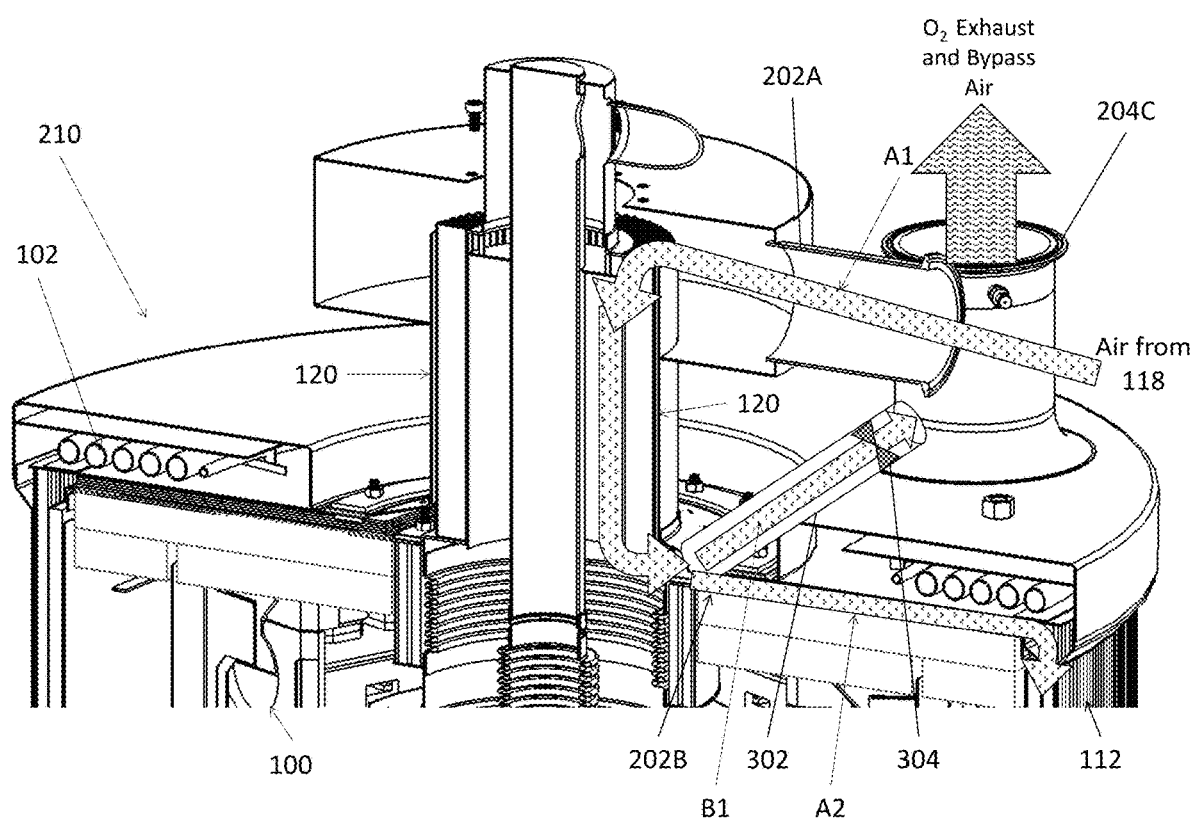
FIG. 3 is a cross-sectional perspective view showing a portion of an electrolyzer system of FIG. 2, according to various embodiments of the present disclosure.

FIG. 3 is a cross-sectional perspective view showing a portion of the SOEC system 200 of FIG. 2, according to various embodiments of the present disclosure. Referring to FIGS. 2 and 3, the system 200 may include an air conduit assembly 202 including the air conduits 202A, 202B, 202C and 202D, and an exhaust assembly 204 including the exhaust conduits 204A, 204B, and 204C. The SOEC system 200 may also include an air splitter 300, a bypass conduit 302, and an optional bypass valve 304.

The air conduit assembly 202 may fluidly connect the air blower 118, the product cooler 120, the air recuperator 112, the air heater 114, and the stack 100, so that the air inlet stream may be provided to the stack 100. In particular, the air blower 118 may be fluidly connected to an air inlet of the product cooler 120 by the air conduit 202A. An air outlet of the product cooler 120 may be fluidly connected to an air inlet of the air recuperator 112 by the air conduit 202B. An air outlet of the air recuperator 112 may be fluidly connected to an air inlet of the air heater 114 by the air conduit 202C. An air outlet of the air heater 114 may be fluidly connected to an air inlet of the stack 100 by the air conduit 202D.

The exhaust assembly 204 may fluidly connect the stack 100, the air recuperator 112, and the optional water preheater 102, so that oxygen exhaust generated by the stack 100 may be expelled from the hotbox 210 and/or exhausted from the SOEC system 200. In particular, an outlet of the stack 100 may be fluidly connected to an exhaust inlet of the air recuperator 112 by the exhaust conduit 204A. An exhaust outlet of the air recuperator 112 may be fluidly connected to an exhaust inlet of the water preheater 102 by the exhaust conduit 204B. An exhaust outlet of the water preheater 102 may be fluidly connected to the exhaust conduit 204C.

In some embodiments, the splitter 300 may be a T-junction formed by joining an inlet end of the exhaust conduit 302 to the air conduit 202B between the product cooler 120 and the air recuperator 112. In one embodiment, the splitter 300 may be located outside the hotbox 210. The splitter 300 is configured to divert a portion of the air inlet stream from air conduit 202B into the bypass conduit 302. The bypass conduit 302 may fluidly connect the splitter 300 and/or air conduit 202B to the exhaust conduit 204C. Accordingly, the bypass conduit 302 may be configured such that some of the air provided by the air blower 118 is not routed into the hotbox 210 and bypasses the air heater 114 and the stack 100. This permits the air heater 114 to operate at a lower power.

As shown in FIG. 3, during system 200 operation, a first air inlet stream A1 output from the air blower 118 may be provided to the product cooler 120 by the air conduit 202A. The first air inlet stream A1 may include the total air mass flow output by the air blower 118. The first air inlet stream A1 may be used to cool the hydrogen product stream passing through the product cooler 120 and then may exit the product cooler 120 and enter air conduit 202B.

A portion of the first air inlet stream A1 may be diverted into the bypass conduit 302 by the splitter 300. In particular, the splitter 300 may split first air inlet stream A1 into a second air inlet stream A2 that flows through the air conduit 202B to the air recuperator 112 and a bypass air stream B1 that flows through the bypass conduit 302 to the exhaust conduit 204C and then exits the system 200. The air recuperator 112 may preheat the second air inlet stream A2 using the oxygen exhaust. The preheated second air inlet stream A2 may flow through the air conduit 202C to the air heater 114 for additional heating and then may be provided to the stack 100 via the air conduit 202D.

In some embodiments, the mass flow rate of the bypass air stream B1 may range from about 5% to about 50%, such as from about 10% to about 45%, or from about 20% to about 40%, of the mass flow rate of the first air inlet stream A1. In other words, from about 5% to about 50% by volume of the first air inlet stream A1 may be diverted to form the bypass air stream B1. A remaining (un-diverted) portion of the first air inlet stream A1 forms the second air inlet stream A2.

In one embodiment, the bypass conduit 302 may be configured to passively control the air inlet stream diversion. For example, a mass flow rate of the bypass air stream B1 may be controlled by selecting a cross-sectional area of one or more portions of the bypass conduit 302. For example, the cross-sectional area of at least a portion of the bypass conduit 302 and/or the splitter 300 may be set according to a desired air mass flow rate through the bypass conduit 302. In other words, the bypass conduit 302 and/or the splitter 300 may include a reduced diameter orifice that is configured to provide a flow restriction that results in a desired bypass air mass flow rate. In this embodiment, the optional bypass valve 304 may comprise a non-return valve which prevents the oxygen exhaust from flowing into the splitter 300 from the exhaust conduit 204.

In an alternative embodiment, the optional bypass valve 304 may comprise a controllable valve disposed on the bypass conduit 302. The bypass valve 304 may be any suitable type of valve, such as a butterfly valve, proportional valve, or the like. Preferably, the bypass valve 304 is an electrically actuated valve that may be controlled by the controller 122 to actively control the bypass air stream B1 flow rate through the bypass conduit 302. In one embodiment, an additional non-return valve may be provided on the bypass conduit 302 to prevent the oxygen exhaust from flowing into the splitter 300 from the exhaust conduit 204.

The controller 122 may control the bypass valve 304 in order to control an amount (e.g., flow rate) of the air inlet stream flowing through the air heater 114 to the stack 100. In various embodiments, the controller 122 may control the bypass valve 304 to provide a sufficient air inlet stream flow rate needed to sweep the oxygen generated during the electrolysis. For example, the controller 122 may be configured to open or partially open the bypass valve 304, to increase bypass air stream B1 flow rate through the bypass conduit 302, if the amount of oxygen generated in the stack 100 by electrolysis is decreased. The controller 122 may also be configured to close or partially close the bypass valve 304, to decrease the bypass air stream B1 flow rate through the bypass conduit 302, if the amount of oxygen generated in the stack 100 by electrolysis is increased.

Figure 4A:
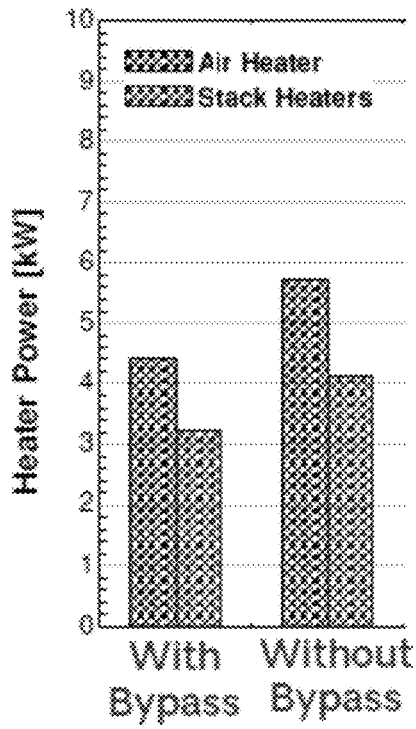
FIG. 4A is a graph showing heater power consumption with and without utilizing air bypass.
Figure 4B:
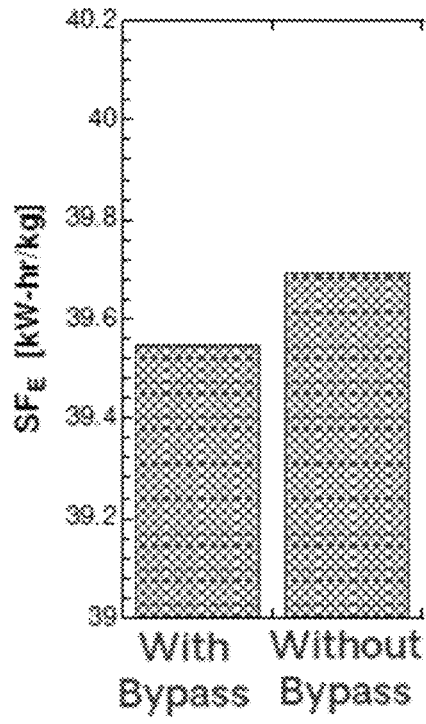
FIG. 4B is a graph showing system efficiency with and without utilizing air bypass.
Figure 4C:
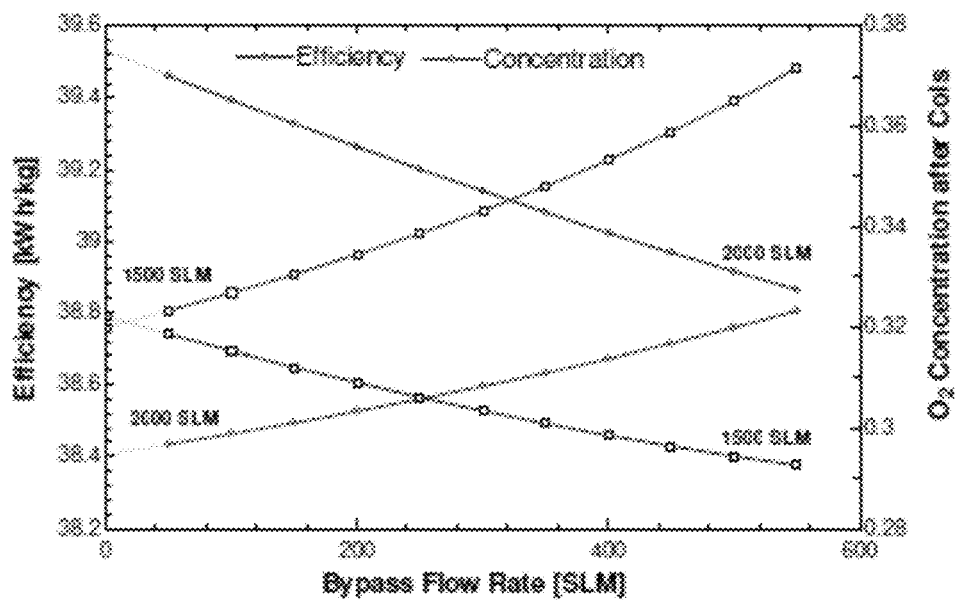
FIG. 4C is a graph showing a simulated efficiency and oxygen concentration at different bypass flow rates.

FIG. 4A is a graph showing air and stack heater power consumption with and without utilizing air bypass, FIG. 4B is a graph showing system efficiency with and without utilizing air bypass, and FIG. 4C is a graph showing simulated system efficiency and oxygen concentration at different air bypass flow rates for 1500 and 2000 SLM air inlet stream flow rates. The left vertical axis in FIG. 4C is provided in units of kWh per kilogram of hydrogen produced. These units correspond to hydrogen product cost, which is proportional to 1 divided by efficiency.

As shown in FIGS. 4A-4C, air and stack heater power is reduced and system efficiency is increased when air bypass is used to reduce air flow through the air heater 114. For example, the air bypass reduces the air heater power consumption and thereby improves overall system efficiency. In addition, the air bypass is not expected to result in an excessive increase in oxygen concentration leaving the stack columns.

Various embodiments provide a system that utilizes the entire incoming air inlet stream to cool the hydrogen product gas before splitting the air inlet stream, such that a portion of the air inlet stream bypasses the stack and optionally hotbox. As such, the air flow rate through the air recuperator and the air heater may be reduced. The bypass effect can lower the internal air and stack heater power by as much as 1 kW, improving the overall system efficiency.

Additionally, by utilizing a single incoming air inlet stream to both provide adequate cooling for the hydrogen product gas, while minimizing the amount of air flow across the electric heaters, it is possible to optimize the performance of the SOEC system without adding the complexity of generating a completely separate second air inlet stream for hydrogen product stream cooling, such as by using a second air blower.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. An electrolyzer system, comprising:
    a splitter configured to split a first air inlet stream into a bypass air stream and a second air inlet stream;
    a stack of electrolyzer cells configured receive steam and the second air inlet stream and output a product stream containing hydrogen and an oxygen exhaust stream, wherein the bypass air stream is configured to bypass the stack; and
    a product cooler heat exchanger configured to cool the product stream using the first air inle stream.

2. The electrolyzer system of claim 1, further comprising an air heater configured to heat the second air inlet stream before the second air inlet stream is provided to the stack.

3. The electrolyzer system of claim 2, wherein:
    the stack of electrolyzer cells comprises a stack of solid oxide electrolyzer cells; and
    the bypass air stream is configured to bypass the air heater and is configured not to be provided to the air heater or to the stack.

4. The electrolyzer system of claim 2, further comprising:
    an air blower configured to provide the first air inlet stream to the product cooler heat exchanger;
    a first air conduit fluidly connecting the air blower to the product cooler heat exchanger;
    an exhaust conduit assembly fluidly connected to the stack and configured to receive the oxygen exhaust stream from the stack and to exhaust the oxygen exhaust stream from the electrolyzer system; and
    a bypass conduit fluidly connecting the splitter to the exhaust conduit assembly and configured to deliver the bypass air stream from the splitter to the exhaust conduit assembly while bypassing the stack.

5. The electrolyzer system of claim 4, further comprising a bypass valve configured to control a flow rate of the bypass air stream through the bypass conduit.

6. The electrolyzer system of claim 5, further comprising a controller configured to control the bypass valve based on an oxygen content of the oxygen exhaust, wherein the bypass valve is an electrically actuated valve.

7. The electrolyzer system of claim 4, further comprising a hotbox housing the stack and the air heater, wherein the bypass conduit is disposed outside of the hotbox and is fluidly connected to a portion of the exhaust conduit assembly that is disposed outside of the hotbox.

8. The electrolyzer system of claim 7, wherein the splitter is disposed outside of the hotbox, such that the bypass conduit bypasses the hotbox.

9. The electrolyzer system of claim 2, further comprising an air recuperator heat exchanger configured to preheat the second air inlet stream using the oxygen exhaust stream before the second air inlet stream is provided to the air heater.

10. The electrolyzer system of claim 1, wherein a flow rate of the bypass air stream is configured to be at least 10% of a flow rate of the first air inlet stream.

* * * * *